US010341863B2

(12) United States Patent
Fontana et al.

(10) Patent No.: US 10,341,863 B2
(45) Date of Patent: Jul. 2, 2019

(54) METHOD AND SYSTEM FOR AUTHENTICATING A USER AND A MOTOR VEHICLE

(71) Applicant: VOLKSWAGEN AG, Wolfsburg (DE)

(72) Inventors: Dino Fontana, Gladbeck (DE); Sascha Jurthe, Hattingen (DE)

(73) Assignee: VOLKSWAGEN AG (DE)

(*) Notice: Subject to any disclaimer, the term of this patent is extended or adjusted under 35 U.S.C. 154(b) by 11 days.

(21) Appl. No.: 15/443,325

(22) Filed: Feb. 27, 2017

(65) Prior Publication Data

US 2017/0257759 A1 Sep. 7, 2017

(30) Foreign Application Priority Data

Mar. 3, 2016 (DE) ........................ 10 2016 203 521

(51) Int. Cl.

| | |
|---|---|
| ***B60R 25/20*** | (2013.01) |
| ***H04B 13/00*** | (2006.01) |
| ***H04L 29/06*** | (2006.01) |
| ***H04L 29/08*** | (2006.01) |
| ***H04W 12/06*** | (2009.01) |
| ***H04W 12/08*** | (2009.01) |
| ***H04B 1/3822*** | (2015.01) |

(52) U.S. Cl.

CPC ......... *H04W 12/06* (2013.01); *B60R 25/2027* (2013.01); *H04B 1/3822* (2013.01); *H04B 13/005* (2013.01); *H04W 12/08* (2013.01); *H04L 63/0853* (2013.01); *H04L 67/12* (2013.01)

(58) Field of Classification Search

CPC ... H04B 13/005; H04B 1/3822; G06F 1/1643; G06F 3/011; G06F 1/1698; G07C 2009/00809; G07C 9/00309; H04W 12/06; H04W 12/08

See application file for complete search history.

(56) References Cited

U.S. PATENT DOCUMENTS

| | | | | |
|---|---|---|---|---|
| 5,204,672 | A | 4/1993 | Brooks | |
| 5,811,897 | A * | 9/1998 | Spaude | B60R 25/2027 307/149 |
| 7,102,487 | B2 | 9/2006 | Mafune et al. | |

(Continued)

FOREIGN PATENT DOCUMENTS

| | | | |
|---|---|---|---|
| CN | 1307711 | A | 8/2001 |
| CN | 103544490 | A | 1/2014 |

(Continued)

OTHER PUBLICATIONS

Search Report from German Patent Application No. 10 2016 203 521.5; dated Jun. 14, 2016.

(Continued)

*Primary Examiner* — Nizar N Sivji

(74) *Attorney, Agent, or Firm* — Barnes & Thornburg LLP

(57) ABSTRACT

A method for authenticating a user with respect to a facility, for example, with respect to a vehicle. A signal having an item of information relating to the user is injected into skin of the user by a transmitting device. Direct contact is established between the skin of the user and a receiving device assigned to the facility, with the result that the signal is transmitted from the skin of the user to the receiving device. The user is also authenticated based on the signal received by the receiving device.

18 Claims, 4 Drawing Sheets

1
2
3
4
5

(56) References Cited

U.S. PATENT DOCUMENTS

| | | | | |
|---|---|---|---|---|
| 2008/0209545 | A1* | 8/2008 | Asano | H04L 9/3273 726/19 |
| 2009/0088114 | A1 | 4/2009 | Yoshida et al. | |
| 2012/0026129 | A1* | 2/2012 | Kawakami | G06F 1/1643 345/174 |

FOREIGN PATENT DOCUMENTS

| | | | |
|---|---|---|---|
| CN | 105184136 | A | 12/2015 |
| DE | 19547560 | A1 | 6/1997 |
| DE | 19617038 | A1 | 11/1997 |
| DE | 19752974 | A1 | 9/1998 |
| DE | 19818263 | A1 | 10/1999 |
| DE | 10132031 | A1 | 1/2003 |
| DE | 60004980 | T2 | 7/2004 |
| DE | 69913607 | T2 | 9/2004 |
| DE | 60008445 | T2 | 12/2004 |
| DE | 69822970 | T2 | 4/2005 |
| DE | 69635793 | T2 | 7/2006 |
| DE | 102013019746 | A1 | 5/2015 |
| EP | 0109184 | A2 | 5/1984 |
| EP | 0843425 | A2 | 5/1998 |
| EP | 1045947 | A1 | 10/2000 |
| EP | 1239420 | A1 | 9/2002 |
| FR | 2963717 | A1 | 2/2012 |

OTHER PUBLICATIONS

Office Action from Chinese Patent Application No. 201710123854.2; dated Sep. 28, 2018.

* cited by examiner

METHOD AND SYSTEM FOR AUTHENTICATING A USER AND A MOTOR VEHICLE

PRIORITY CLAIM

This patent application claims priority to German Patent Application No. 10 2016 203 521.5, filed 3 Mar. 2016, the disclosure of which is incorporated herein by reference in its entirety.

SUMMARY

Illustrative embodiments relate to a method and a system for authenticating a user and to a motor vehicle.

BRIEF DESCRIPTION OF THE DRAWINGS

Further configurations are described in more detail below using the exemplary embodiments which are illustrated in the drawings but to which exemplary embodiments are generally not restricted overall. In the drawings.

DETAILED DESCRIPTION

Figure 1:
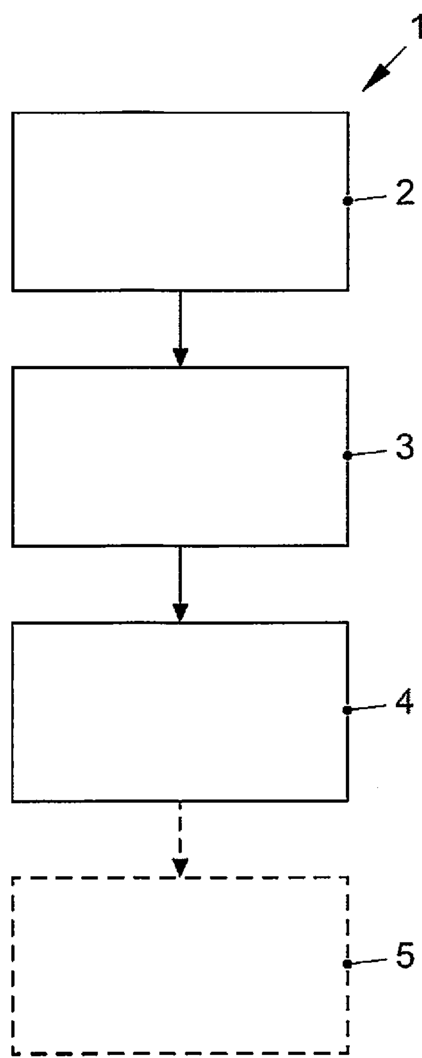
FIG. 1 shows a flowchart for a method according to at least one exemplary embodiment.

A multiplicity of areas or facilities can be protected from a user, for example, against access. To allow access to the user, the user can be authenticated. If this results in successful authentication, the user can be granted access to the area or the facility. The facility may be, for example, a locked room, a vehicle, a machine or the like.

A multiplicity of systems which operate in a contactless manner and in which it is possible to dispense with a mechanical key are known for the purpose of unlocking a vehicle or else triggering other functions in a vehicle, for example, for the purpose of starting an engine. A vehicle key is required in many of these systems, for example, a radio remote control, a transponder in a so-called keyless entry system, a smartphone or the like. Apart from the keyless entry system as a contactless authentication system, interaction between the user and the vehicle key is necessary in other systems to unlock the vehicle or start another function. This is undesirable because the user must search for the vehicle key to unlock the vehicle or be authenticated.

EP 1 239 420 A1 attempts to provide an identification system and a matching code transmitter which provide improved security against unauthorized use or unauthorized access. For this purpose, a question-answer dialog is carried out in the identification system between an object and the code transmitter, by means of which code information is interchanged and verified. So that only a code transmitter in the vicinity of the object can obtain proof of authorization to access the object or use the object, a code transmitter must detect a separately generated electromagnetic field on the object side. This is the case only when the user with the code transmitter is in the vicinity of the object. Only then is the authorized code signal used as proof of authorized access or authorized use of the object. In addition, the code transmitter can only be in the vicinity of the motor vehicle when access or use is requested. It is determined whether the code transmitter is in the vicinity by setting up an electromagnetic field in the region of an access door. If a user moves his hand into the vicinity of a door handle, for example, this field is injected into the user's body. The setting-up of such fields may result in a relatively high energy consumption under unfavorable circumstances. This is undesirable.

There is therefore a need to improve a concept for authenticating a user with respect to a facility. The method and the system in the independent claims take this need into account.

Disclosed embodiments relate to a method for authenticating a user with respect to a facility, for example, with respect to a vehicle. For this purpose, a signal comprising an item of information relating to the user is injected into skin of the user by means of a transmitting device. Furthermore, direct contact is established between the skin of the user and a receiving device assigned to the facility, with the result that the signal is transmitted from the skin of the user to the receiving device. The user is then authenticated on the basis of the signal received by means of the receiving device.

Disclosed embodiments also relate to a system for authenticating a user with respect to a facility. The system comprises a transmitting device which is designed to inject a signal containing an item of information relating to the user into the skin of the user. The system also comprises a receiving device which is assigned to the facility and is designed to receive the signal in the event of direct contact between the skin of the user and the receiving device. The system also comprises a control device which is designed to authenticate the user on the basis of the signal received by means of the receiving device.

In some exemplary embodiments, security during authentication can be increased by virtue of signals being transmitted via the skin of the user when the latter is in contact with the facility or a receiving device assigned to the latter. At the same time, convenience can possibly also be increased since a user must only touch a receiving device for communication or signal transmission. It is possible to dispense with active actuation or triggering of the transmitting device by the user, for example. The signal which is injected into the skin may be transmitted, for example, only via the skin of the user and/or only via a surface of the user to the receiving device or to an area of the skin which is in contact with the receiving device. The skin and/or the surface of the user may be, for example, an area of the user which enters the user's body to a depth of at most 0.1 mm, 0.2 mm, 0.3 mm, 0.4 mm, 0.5 mm, 0.6 mm, 0.7 mm, 0.8 mm, 0.9 mm, 1.0 mm, 1.2 mm, 1.3 mm, 1.4 mm, 1.5 mm, 1.6 mm, 1.7 mm, 1.8 mm, 1.9 mm, 2.0 mm, 2.5 mm, 3.0 mm, 3.5 mm, 4.0 mm. The thickness of the skin and/or of the area may be, for example, the length of a surface normal starting from the surface. The skin may be, for example, the entire organ or parts of the latter closing off the body to the outside.

In some exemplary embodiments, the transmitting device for injecting the signal may be in direct contact with the skin of the user. In some exemplary embodiments, this also makes it possible to dispense with setting up a field for capacitive coupling, which field makes it possible to transmit signals even without direct contact. Naturally, in some exemplary embodiments, the signal can be injected into the skin even without direct contact between the transmitting device and the skin. For example, the transmitting device can then also be carried in a pocket and not directly on the user's body.

Additionally or alternatively, the signal may be a voltage and/or a current. In some exemplary embodiments, this makes it possible to reliably transmit all possible information, which is coded and/or modulated, with a low expenditure of energy and possibly also a low expenditure with respect to the transmitting device. The transmitting device may comprise, for example, at least one electrode which is in contact with the user's skin. Additionally or alternatively, the receiving device may comprise, for example, at least one electrode which is in contact with the user's skin.

Optionally, the signal may be an ultrasonic signal. In some exemplary embodiments, this method can also be used for a group of persons not suitable or suitable only to a limited extent for transmission of current and/or voltage signals via the skin possibly under unfavorable circumstances, for example, persons with a pacemaker. The transmitting device may comprise, for example, at least one ultrasonic transmitter, and/or the receiving device may comprise an ultrasonic sensor or receiver.

Additionally or alternatively, the transmitting device may be assigned to a portable device, for example, a wearable, a smartphone, a smartwatch, a vehicle key, an implant, an electronic skin prosthesis or the like. In some exemplary embodiments, this may mean that the transmitting device can be worn close to the user's body. In some exemplary embodiments, the user then does not need to search for the device with the assigned transmitting device to communicate with the facility. In exemplary embodiments in which the device with the transmitting device is worn directly on the body or the skin, for example, as a smartwatch, the transmitting device can inject the signal directly into the skin.

Additionally or alternatively, the user can be allowed to access a function after successful authentication. In some exemplary embodiments, this may mean that only an authenticated user can perform the function, for example, can unlock a vehicle door and/or start an engine, can lock the vehicle, can open an individual flap of a vehicle or the like. Under certain circumstances, security can thus be increased when determining whether a user can perform the function.

Additionally, further authentication of the user can be carried out by means of a further item of information relating to the user. In some exemplary embodiments, security can be increased further thereby. Only after a first authentication stage has been overcome is information allowing access to the function interchanged. A second authentication stage is therefore introduced. Under certain circumstances, this makes it possible to at least reduce, if not completely avoid, the risk of the information needed to access the function being intercepted.

Additionally, the further authentication can be carried out by means of a wireless signal transmission method. In some exemplary embodiments, this may mean that the signals are transmitted via the skin as briefly as possible and/or only with a low intensity. To transmit the information for the second authentication stage, signal transmission methods which allow better signal transmission and allow a greater transmission speed and/or the transmission of a larger quantity of data, for example, can then possibly be selected. In some exemplary embodiments, it may be necessary for the user's hand to be in direct material contact with the receiving device even during the second authentication. Alternatively, the further authentication can naturally also be carried out via the skin and with direct contact with the receiving device in some exemplary embodiments.

Disclosed embodiments also relate to a system for authenticating a user with respect to a facility. The system comprises a transmitting device which is designed to inject a signal containing an item of information relating to the user into the skin of the user. The system also comprises a receiving device which is assigned to the facility and is designed to receive the signal in the event of direct contact between the skin of the user and the receiving device. The system also comprises a control device which is designed to authenticate the user on the basis of the signal received by means of the receiving device.

Disclosed embodiments likewise relate to a motor vehicle having a locking mechanism which is designed to be unlocked in response to successful authentication according to at least one of the exemplary embodiments described. In some exemplary embodiments, this makes it possible for a vehicle door, a vehicle flap or another flap, for example, a tank cap, an engine hood or a tailgate, of a motor vehicle to be unlocked in a manner which is very safe and convenient for a user.

Disclosed embodiments likewise relate to a motor vehicle having a starting mechanism which is designed to allow starting in response to successful authentication using a method according to at least one of the preceding exemplary embodiments, for example, after pressing a start button and/or without pressing the start button directly after successful authentication.

Various exemplary embodiments are now described in more detail with reference to the accompanying drawings in which some exemplary embodiments are illustrated. In the figures, the thickness dimensions of lines, layers and/or regions may be represented in an exaggerated manner for the sake of clarity.

FIG. 1 shows a flowchart for a method 1 according to at least one exemplary embodiment for authenticating a user with respect to a facility, for example, with respect to a vehicle. In a first operation 2 of the method 1, a signal comprising an item of information relating to the user is injected into the user's skin by means of a transmitting device. In a further operation 3, direct contact is established between the user's skin and a receiving device assigned to the facility, with the result that the signal is transmitted from the user's skin to the receiving device. In an operation 4, the user is then authenticated on the basis of the signal received by means of the receiving device.

The operations 1 and 2 can be carried out in this case at the same time, in an at least partially overlapping manner in terms of time or in succession. For example, the user can also establish the direct contact between his skin and the receiving device before a signal is injected into his skin. Under certain circumstances, other operations may also take place in between. For example, after the user has established direct skin contact with the receiving device, he can also receive a further signal from the facility or its receiving device which may then be a transmitting/receiving device. This further signal may possibly cause the transmitting device to inject the signal into the user's skin. For this purpose, the transmitting device may likewise be a transmitting/receiving device which can receive signals from the facility. Furthermore, the signal may also have already been injected into the skin before the user establishes the direct skin contact with the facility.

The user may be, for example, a person having authorization to use or access the facility, for example, a driver, a front-seat passenger, an owner of the facility. The facility may be, for example, any facility for which authorization is required to perform a function and/or obtain access, for example, a room, a machine, a vehicle, a vehicle door, a tailgate, a locking mechanism of a vehicle, a starting mechanism of the vehicle or the like.

For the purpose of authentication, it is possible, for example, to compare a comparison value and/or a comparison range with the information relating to the user. If the comparison reveals that the information relating to the user corresponds to the comparison value and/or is in the comparison range, authentication may be successful. If the comparison reveals that the information relating to the user does not match the comparison value and/or is not in the comparison range, authentication fails. For example, the user can then be denied access to the facility and/or to a function of the facility.

The information relating to the user may comprise, for example, any information which allows a statement to be made regarding whether the user is authorized to access the facility. The information may be, for example, a predefined value, for example, a fixed, static value such as a PIN or an identification number. Optionally, the information may also be a value which is individualized and/or taught for a user and which can be taught by an authorized user of the facility, for example, the vehicle owner, to the vehicle or a vehicle controller, for example, a number, a PIN or the like. Under certain circumstances, a plurality of users may obtain authorization for the facility. In this case, the information relating to the user may be specific to each user or else may be an item of general information which relates only to access authorization. It goes without saying that the information relating to the user may be subjected to signal processing and may be coded and/or modulated in any manner. A signal can be injected into the skin, for example, by using the conductive skin as a signal transmission medium.

Figure 2:
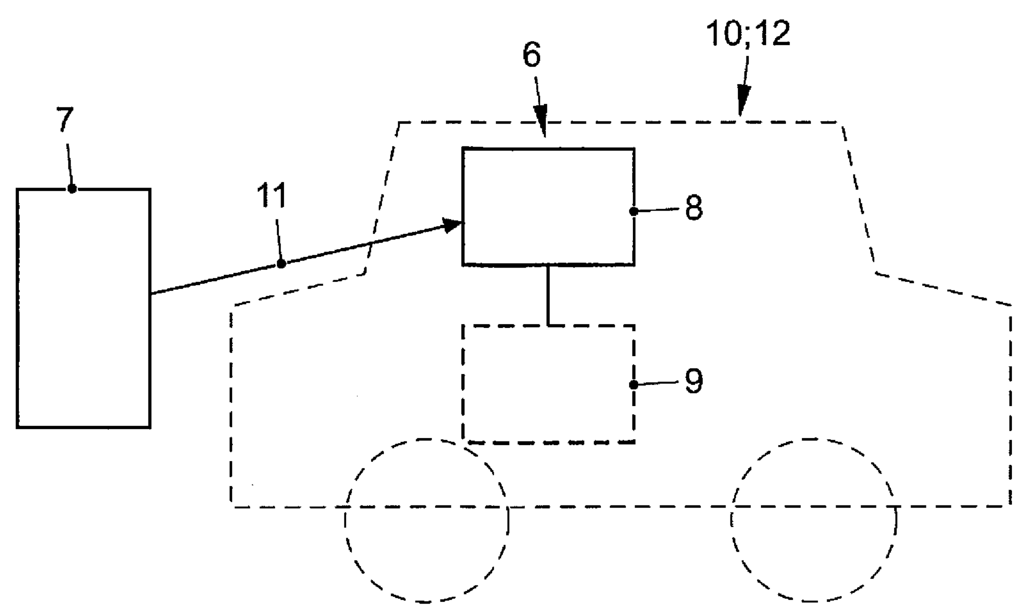
FIG. 2 shows a schematic illustration of a system according to at least one exemplary embodiment.

FIG. 2 shows a schematic illustration of a system 6 for authenticating a user with respect to a facility 12, which is illustrated here using dashed lines and is illustrated as a motor vehicle 10, for example, according to at least one exemplary embodiment. The system 6 comprises a transmitting device 7 which is designed to inject a signal 11 containing an item of information relating to the user into the user's skin. Here and in the text below, the signal 11 may represent, for example, a binary, analog, digital or electrical value or an item of information represented by a value. The signal 11 which is injected into the skin may be, for example, an electrical signal, for example, a current and/or a voltage, and/or an ultrasonic signal. The signal 11 may be modulated and/or coded in any manner, for example. The signal 11 can be injected permanently or at regular intervals, for example. Alternatively, the injection of the signal 11 may be triggered on the basis of an event. An event which triggers the injection of the signal 11 may be, for example, a movement of the user, reception of the signal by the facility 12 or its receiving device or the like.

The transmitting device 7 may be all possible apparatuses which are designed to generate the signal 11 containing the information relating to the user and to inject it into the user's skin. For example, the transmitting device 7 may be designed to generate an electrical signal, for example, a current or a voltage. For this purpose, the transmitting device 7 may comprise, for example, at least one or two electrodes. A small alternating current, for example, less than 2 mA, can be injected into the skin via the electrode(s). For example, the signal 11 can be injected according to the principle of body fat measurement. The transmitting device 7 may also be designed to generate an ultrasonic signal as the signal 7. An ultrasonic generator or an ultrasonic sensor can then be used as the transmitting device 7.

The system 6 also comprises a receiving device 8 which is assigned to the facility 12. The receiving device 8 may be assigned to the facility 12, for example, by being coupled to a control device 9 of the facility 12. The receiving device 9 can be coupled to the facility 12 by means of signal transmission, for example; this may be wireless or else coupling via lines, for example. The receiving device 8 may be arranged, for example, on the facility 12, for example, on a vehicle door, or else may be arranged such that it is spatially independent of the facility 12 and is outside the facility 12, for example, at a location at which the facility 12 is at least temporarily situated, such as in a garage.

The receiving device 8 is also designed to receive the signal 11 in the event of direct contact between the user's skin and the receiving device 8. Direct contact between two components, for example, the user's skin and the receiving device, may be present, for example, when they touch and rest directly against one another. For example, they may then not be separated from one another by means of an air gap or another medium. The receiving device 8 may be all possible devices designed to receive the signal 11, for example, an electrode, an ultrasonic receiver or the like.

The system 6 also comprises a control device 9 which is designed to authenticate the user on the basis of the signal received by means of the receiving device 8. For this purpose, the control device 9 and the receiving device 8 can be coupled by means of signal transmission, for example, by means of wireless signal transmission such as radio, WLAN, mobile radio, Bluetooth or the like or via a conductor such as an internal network of the facility, for example, a vehicle network, a bus system, a LAN (local area network) or the like. The control device 9 may be, for example, a programmable hardware component, for example, a processor, a computer processor (CPU=central processing unit), a graphics processor (GPU=graphics processing unit), a computer, a computer system, an application-specific integrated circuit (ASIC), an integrated circuit (IC), a system on chip (SOC), a programmable logic element or a field-programmable gate array (FPGA) having a microprocessor or the like.

Although the transmitting device 7 and the receiver device 8 and the facility 12 are illustrated and described in a common system 6 in FIG. 2, the transmitting device 7 and the receiver device 8 may also be exemplary embodiments separately from one another.

Figure 3:
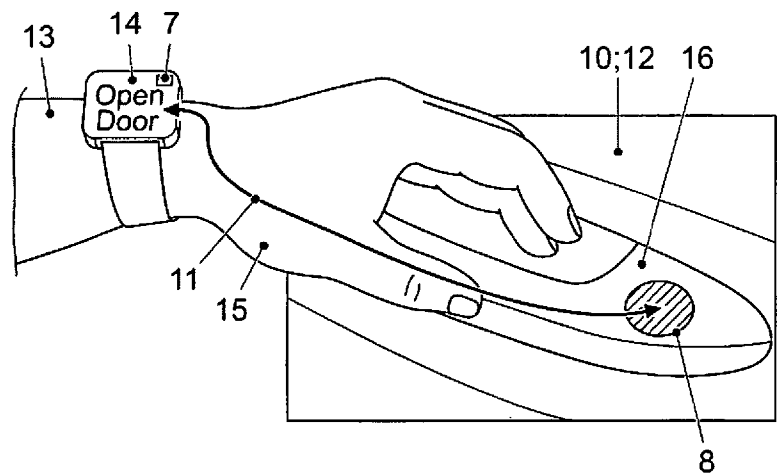
FIG. 3 shows a schematic illustration of a section of a motor vehicle at which a user is authenticated according to at least one exemplary embodiment.

FIG. 3 shows a schematic illustration of a section of a motor vehicle 10 as a facility 12 at which a user 13, whose hand is illustrated, is authenticated with the system 6 according to at least one exemplary embodiment of the method 1. In this case, the authentication and unlocking of the vehicle 10 are carried out by means of tactile contact between the user 13 and the vehicle 10. In this case, the user 13 wears a smartwatch which comprises the transmitting device 7. In some further exemplary embodiments (not illustrated), the transmitting device may also be arranged in another portable device, for example, a wearable. Electrical contact, for example, via the door handle 16, with the vehicle 10 is then established via the skin 15 of the user 13. The signal 11, for example, is transmitted via the electrical contact. In this case, the receiving device 8 is arranged in or on the door handle 16. In this case, the receiving device 8 is understood as meaning that area of the vehicle 10 or of the facility 12 at which the signal 11 is transmitted from the skin 15 of the user 13 to the vehicle 10 or the facility 12. Communication takes place exclusively or only by means of skin contact. Direct data communication via the skin 15 allows the authentication. The actual authentication is initiated and carried out via this electrical contact. Smartwatch-hand-door handle contact is therefore, effected, and is used to carry out the authentication in the operation 4 which can also be referred to as initiation. Further authentication can be carried out as operation 5 which is illustrated using dashed lines in FIG. 1. The further authentication is carried out using a further item of information relating to the user. In exemplary embodiments in which the further authentication is carried out in the operation 5, the operation 4, if successful, may be only an operation which triggers the further authentication in the operation 5.

In other words, initiation, authentication and unlocking of a locking mechanism (not illustrated) of a vehicle 10 or only of a vehicle door can be carried out directly via the hand. In the configuration in FIG. 3, the actual authentication is directly carried out by means of data communication via the skin. The vehicle 10 is locked. The user 13 of the vehicle 10 wears the wearable 14 on his wrist and touches the door handle 16. A sensor system of the vehicle 10, i.e., the receiving apparatus 8, then sets up a connection to the wearable 14 via the skin 15 of the user 13 and runs through the authentication at the vehicle 10.

Furthermore, the key or the information relating to the user may be both hard-coded in a secure memory and provided via a data connection. The wearable which comprises the transmitting device 7 may be equipped with contacts which enable electrical conduction via the skin 15 of the wearer. In the case of a smartwatch, these contacts may be located, for example, in a watch cover, a strap, a clasp or at another position with contact to the skin of the user 13 who can also be referred to as the wearer. The transmitting device 7 may be arranged in different wearables. Under certain circumstances, the wearable may not be a smartwatch, but rather may be another electronic device with skin contact, for example, a chain, an implant or the like. The vehicle 12 may likewise have suitable actuators and sensors as the receiving device 8 to enable data communication by means of electrical conduction via the skin 15. This may be integrated in the door handle 16, for example, or else other installation locations on or in the vehicle 10 are possible. For example, the receiving device 8 may be arranged on a fender of the vehicle 10, with the result that the vehicle 10 can be unlocked if the fender is stroked. However, a multiplicity of different contact points are also conceivable. The contact point of the hand on the vehicle 10 need not be the door handle 16; another contact area which comprises the receiving device 8 is also possible. The entire vehicle 10 may possibly be used as a contact area for skin conduction.

Figure 4:
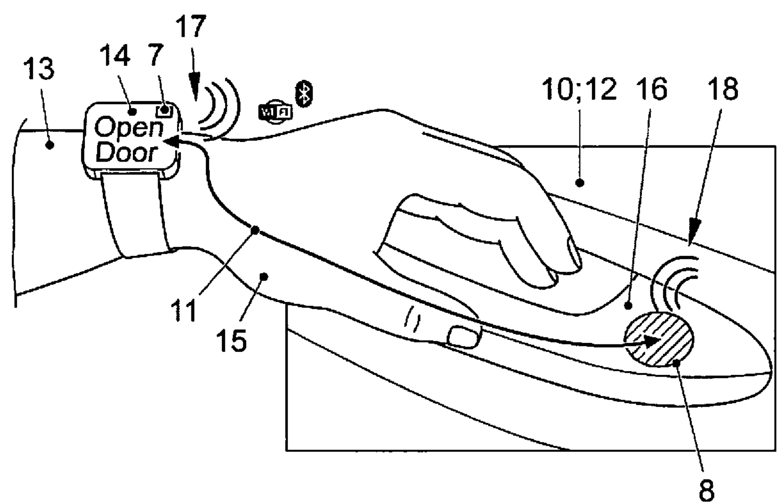
FIG. 4 shows a schematic illustration of a section of a motor vehicle at which a user is authenticated according to another exemplary embodiment.

FIG. 4 shows a schematic illustration of a section of the motor vehicle 10 at which the user 13 is authenticated according to another exemplary embodiment. The exemplary embodiment in FIG. 4 is substantially similar to the exemplary embodiment in FIG. 3. Identical or similar components are therefore denoted using identical reference symbols. The vehicle 10 is locked. In addition to the transmitting device 7, which may also be referred to as a skin contact control device and is designed to inject the signal into the skin, the smartwatch 14 also comprises an interface 17 for wireless signal transmission, for example, a WLAN or Bluetooth interface. The user 13 of the vehicle 10 wears the wearable 14 on his wrist and touches the door handle 16. The receiving device 8 of the vehicle 10 then registers contact with the wearable via the skin 15 of the user 13 and initiates, via the interface 17 which can also be referred to as an air interface, a secure connection via which the user 13 is then authenticated. An interface 18 is provided on the vehicle 10 and is used to receive the data transmitted via the interface 17. In other words, it can only be initiated by means of the skin contact. The actual transmission of data then takes place via wireless signal transmission between the interfaces 17 and 18, for example, as conventional radio technology, as further authentication in the operation 5. Initiation is effected directly via the hand, and authentication and unlocking are carried out via radio. In other words, communication is effected via skin contact and a radio connection. The data communication via the skin is used only to initiate conventional radio data communication. The actual authentication takes place via a suitable radio channel. In some exemplary embodiments, the authentication can be carried out via the skin contact, the radio connection and a secret, for example, to increase security. Data communication via the skin transmits a secret, for example, a token or a random number, which makes conventional radio data communication more secure. A secret can naturally also be transmitted without a radio connection, that is to say, in exemplary embodiments in which wireless signal transmission is not used.

In some exemplary embodiments, the authentication at a vehicle can be simplified and can be enabled without additional user interaction. This is achieved with the aid of tactile contact between the user and the vehicle. In this case, the user wears, for example, a smartwatch, which comprises the transmitting device 7, on his wrist, which smartwatch establishes electrical contact with the vehicle 10 via the user's skin and initiates, starts and/or carries out authentication. In some exemplary embodiments, the actual authentication can be carried out directly via the skin to the door handle, via an air interface using wireless signal transmission methods, for example, conventional radio technologies, or by means of a mixture of the two.

Figure 5:
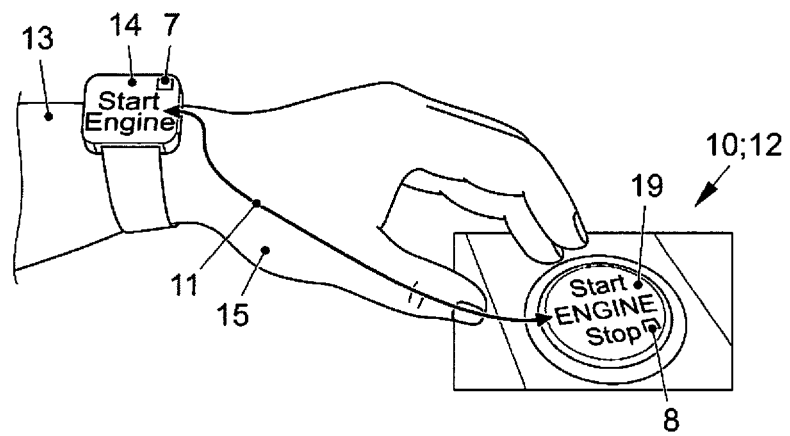
FIG. 5 shows a schematic illustration of a section of a motor vehicle at which a user is authenticated according to another exemplary embodiment.

FIG. 5 shows a schematic illustration of a section of a motor vehicle 10 at which a user 13 is authenticated according to another exemplary embodiment. The exemplary embodiment in FIG. 5 is substantially similar to the exemplary embodiment in FIG. 3. Identical or similar components are therefore denoted using identical reference symbols. However, the function which is controlled after successful authentication is not a locking mechanism of the vehicle 10, but rather a starting mechanism for an engine of the vehicle 10. For this purpose, a start button 19 comprises the receiving device 8. In this case, like in the exemplary embodiment in FIG. 3, initiation, authentication and a start/stop function, that is to say starting of the engine and/or switching-off of the engine, can be carried out directly via the hand and/or the skin of the user 13. In some exemplary embodiments, it may be necessary to mechanically actuate or press the start button 19 to start the engine. In other exemplary embodiments, it is possible to dispense with mechanical actuation or pressing of the start button 19.

Figure 6:
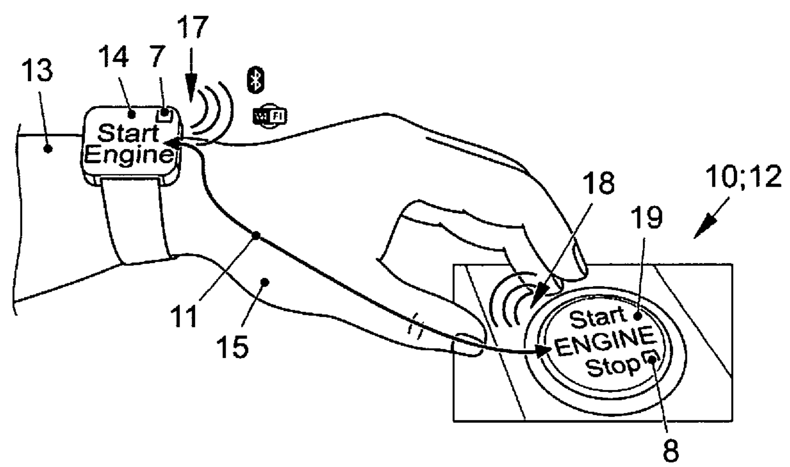
FIG. 6 shows a schematic illustration of a section of a motor vehicle at which a user is authenticated according to another exemplary embodiment.

FIG. 6 shows a schematic illustration of a section of a motor vehicle 10 at which a user 13 is authenticated according to another exemplary embodiment. The exemplary embodiment in FIG. 6 is substantially similar to the exemplary embodiment in FIG. 5. Identical or similar components are therefore denoted using identical reference symbols like in the exemplary embodiment in FIG. 5, the function which is controlled after successful authentication is the starting mechanism for an engine of the vehicle 10. However, like the method in FIG. 4, the method comprises two authentication stages. The further authentication in the operation 5 is carried out via the wireless signal transmission interfaces 17 and 18. In other words, initiation is carried out directly via the hand and/or the skin 15. Authentication and a start/stop function are carried out via radio or another wireless signal transmission method. In some exemplary embodiments, only information which is relevant to secure communication of other existing radio technologies, for example, Bluetooth (BT), a request to activate a Bluetooth profile, a pairing code or the like or, if WLAN is used as wireless signal transmission, a request to activate a WiFi profile, a password, etc., can be transmitted via the skin. In other exemplary embodiments, complete authentication is carried out via the skin without the aid of further radio technologies.

In some exemplary embodiments, vehicle communication can therefore be enabled via skin contact. Vehicle communication can be achieved by a user touching the vehicle. The user's skin can be used as the data communication medium. Data can be transmitted using sensors and/or actuators of a wearable which have direct or indirect contact with the owner's skin. A smartwatch which has sensors and/or actuators on a housing or in a strap or else a smartphone which is carried by the user 13 in his trouser pocket, for example, is conceivable, for example. Implants or electronic skin prostheses are likewise also conceivable. In this case, the wearables or smartphones may possibly directly access locally stored secure information or may access other memories or external memories, for example, other smart devices such as smartphones or cloud solutions, for example, superordinate server or storage devices having secure information, by means of further radio technologies or wireless transmission methods. In some exemplary embodiments, the transmitting device which is assigned to the wearable or is included in the latter has an integrated secure key. The wearable may be, for example, a smartwatch which has the key integrated in a secure memory, for example. Alternatively, the key may also be integrated and/or stored in an electrically connected accessory part, for example, a strap. Optionally, the key may be integrated or stored in an accessory part which is connected by radio, for example, a smartphone coupled by Bluetooth. This data communication can be used to authenticate a user to consequently unlock or start the vehicle. The authentication by means of a wearable which comprises the transmitting device possibly may not require any additional interaction, for example, the starting of an app or the like. Furthermore, in some exemplary embodiments, the transmitting device need not be held at a particular point, for example, an NFC reader (near field communication).

Smartwatches which comprise the transmitting device can currently be beneficial in terms of handling, for example, because they can be used without interaction and/or because they have been technically developed to a sufficient extent to support this function. The door handle is also a "natural" contact point on the vehicle. In some exemplary embodiments, a great benefit may lie in the communication between a key memory as the transmitting device and the vehicle via the person's skin. In other words, data communication is effected to the vehicle via the conductive skin. There is no need for a field in the object, that is to say for initialization, for example, which must be accessed by the user. Instead, any mechanism which detects interaction of a user, for example, a touch-sensitive sensor in the door handle, is conceivable. Capacitive field coupling may possibly not take place to transmit a code signal for the authorization. Communication takes place either completely via the skin or at least initially via the skin with a subsequent radio connection secured by the initialization, for example, Bluetooth or WLAN. However, the system and the method according to exemplary embodiments may be used not only in vehicle doors, as described, but rather in all possible vehicle access systems or else in any type of access systems (home, vehicle, travel or the like).

The features disclosed in the above description, in the following claims and in the enclosed figures may be important and may be implemented both individually and in any desired combination for implementing an exemplary embodiment in its various configurations.

LIST OF REFERENCE SYMBOLS

1 Method
2 Injection
3 Establishment
4 Authentication
5 Further authentication
6 System
7 Transmitting device
8 Receiving device
9 Control device
10 Motor vehicle
11 Signal
12 Facility
13 User
14 Smartwatch
15 Skin
16 Door handle
17 Interface
18 Interface
19 Start button

The invention claimed is:

1. A method for authenticating a user with respect to a facility, the method comprising:

injecting a signal comprising an item of information relating to the user into the skin of the user by a transmitting device, the injected signal being transmitted via the skin of the user;

establishing direct contact between the skin of the user and a receiving device assigned to the facility, with the result that the signal is transmitted from the skin of the user to the receiving device;

authenticating the user based on the signal received by the receiving device, and further comprising further authenticating the user by transmitting from the user to the receiving device a further item of information relating to the user and/or further comprising further authenticating of the user by a wireless signal transmission method, wherein the signal is injected permanently or at regular intervals, and is injected prior to establishing direct contact.

2. The method of claim 1, wherein the transmitting device for injecting the signal is in direct contact with the skin of the user.

3. The method of claim 1, wherein the signal is a voltage and/or a current.

4. The method of claim 1, wherein the signal is an ultrasonic signal.

5. The method of claim 1, wherein the user is allowed to access a function after successful authentication and further authentication.

6. The method of claim 1, wherein the further authentication is carried out after the authenticating the user based on the signal received by the receiving device.

7. A system for authenticating a user with respect to a facility, the system comprising:

a transmitting device configured to inject a signal containing an item of information relating to the user into the skin of the user, the injected signal is transmitted via the skin of the user;

a receiving device assigned to the facility which receives the signal in the event of direct contact between the skin of the user and the receiving device; and a control device configured to authenticate the user based on the signal received by the receiving device, and wherein the transmitting device further includes an interface for wireless signal transmission, wherein the signal is injected permanently or at regular intervals, and is injected prior to the event of direct contact.

8. The system of claim 7, wherein the transmitting device comprises at least one electrode, and/or the transmitting device comprises at least one ultrasonic transmitter, and/or the receiving device comprises at least one ultrasonic sensor or receiver.

9. The system of claim 7, wherein the transmitting device is assigned to a smartphone, a smartwatch and/or a vehicle key.

10. The system of claim 7, wherein the interface is configured to initiate wireless transmission only after the user is authenticated.

11. The system of claim 10, wherein the wireless transmission is to the facility for a second authentication or to perform a function of the facility.

12. A motor vehicle having a locking mechanism and/or a starting mechanism, wherein the locking mechanism and/or the starting mechanism unlocks at least one vehicle door and/or starts the vehicle in response to successful authentication using a method for authenticating a user with respect to a facility, the method comprising:

injecting a signal comprising an item of information relating to the user into the skin of the user by a transmitting device, the injected signal being transmitted via the skin of the user;

establishing direct contact between the skin of the user and a receiving device assigned to the facility, with the result that the signal is transmitted from the skin of the user to the receiving device;

authenticating the user based on the signal received by the receiving device, and further authenticating the user by transmitting from the user to the receiving device a further item of information relating to the user, wherein the signal is injected permanently or at regular intervals, and is injected prior to the event of direct contact.

13. The motor vehicle of claim 12, wherein the transmitting device for injecting the signal is in direct contact with the skin of the user.

14. The motor vehicle of claim 12, wherein the signal is a voltage and/or a current.

15. The motor vehicle of claim 12, wherein the signal is an ultrasonic signal.

16. The motor vehicle of claim 12, wherein the user is allowed to access a function after successful authentication.

17. The motor vehicle of claim 12, wherein the further authenticating the user is performed_by a wireless signal transmission method.

18. The motor vehicle of claim 12, wherein the further authentication is carried out after the authenticating the user based on the signal received by the receiving device.

* * * * *